(No Model.)

P. F. TURNER.
METHOD OF PREPARING AND HOLDING SAUSAGE CASINGS.

No. 494,907. Patented Apr. 4, 1893.

WITNESSES:
John A. Rennie
E. Sedgwick

INVENTOR
P. F. Turner
BY Munn & Co
ATTORNEYS.

UNITED STATES PATENT OFFICE.

PETER F. TURNER, OF NEW YORK, N. Y.

METHOD OF PREPARING AND HOLDING SAUSAGE-CASINGS.

SPECIFICATION forming part of Letters Patent No. 494,907, dated April 4, 1893.

Application filed February 13, 1893. Serial No. 462,130. (No model.)

*To all whom it may concern:*

Be it known that I, PETER F. TURNER, of the city, county, and State of New York, have invented a new and Improved Method of Preparing and Holding Sausage-Casings, of which the following is a full, clear, and exact description.

Sausage casings as sold commercially are usually in balls or packages, and the several casings of each ball or package are mingled together in such a way that it is difficult to find the ends of the casings, and the casings frequently become so tangled that the whole mass is thrown away and, moreover, where there is no loss in this way the loss of time in handling them is great, as they are with more or less difficulty separated from each other.

The object of my invention is to obviate these difficulties, and provide a method of arranging and holding the casings which will enable an end to be always found, which also causes the casings to be held straight and ready for use, and which therefore enables every casing to be used.

To this end my invention consists in a method of preparing, arranging and holding sausage casings, which method will be hereinafter described and claimed.

Reference is to be had to the accompanying drawings forming a part of this specification, in which similar figures of reference indicate corresponding parts in both the views.

Figure 1:
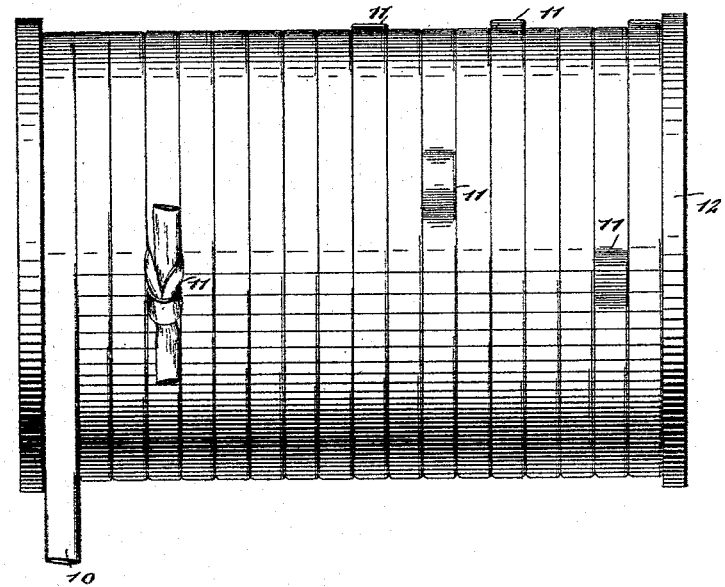
Figure 2:

Figure 1 is a front elevation of a spool or bobbin having a series of sausage casings wound thereon and illustrates the method of holding the casings; and Fig. 2 is a detail view, showing the method of uniting the several casings.

The sausage casings 10 are of the usual kind and my method consists briefly in tying the casings together end to end and winding them upon a spool 12, or other similar revoluble article. The casings 10 are united together so as to form a continuous string by tying them in knots 11, as best shown in Fig. 2, and a long string of casings is thus formed which may be readily wound upon a spool or bobbin 12, or other similar article, and then when the casings are to be used, the spool or bobbin may be hung upon any suitable supporting rod or may be laid upon the floor, or in fact any article, and the casing pulled off easily and rapidly as required. As the casings are pulled off the operator, as fast as a knot is reached, cuts the casings on each side of the knot so as to leave them open and ready to be stuffed. It will be seen that this method enables the casings to be conveniently and rapidly handled and that the only parts wasted are the knots.

Having thus described my invention, I claim as new and desire to secure by Letters Patent—

1. The herein-described method of preparing and holding sausage casings, which consists in tying the casings together end to end so as to form a continuous string, and then winding the string of casings upon a spool or similar article, substantially as described.

2. As an improved article of manufacture, a spool or roll of sausage casings, comprising a revoluble spool, and a string of sausage casings tied end to end and wound upon the spool, substantially as described.

PETER F. TURNER.

Witnesses:
RICHARD S. TREACY,
WM. VAN TURISTERN.